US005947151A

United States Patent [19]

Shafer

[11] Patent Number: 5,947,151

[45] Date of Patent: Sep. 7, 1999

[54] DUAL CONTAINMENT VALVE

[75] Inventor: Terry C. Shafer, Woodlands, Tex.

[73] Assignee: CSR Polypipe, Inc., Houston, Tex.

[21] Appl. No.: 09/006,235

[22] Filed: Jan. 13, 1998

[51] Int. Cl.[6] .......... F16K 27/00

[52] U.S. Cl. .......... 137/375; 251/367

[58] Field of Search .......... 137/375; 251/367

[56] References Cited

U.S. PATENT DOCUMENTS

| | | | |
|---|---|---|---|
| 3,167,088 | 1/1965 | McSmerney | 137/375 |
| 3,821,984 | 7/1974 | Lee . | |
| 4,158,366 | 6/1979 | Van Meter . | |
| 4,311,166 | 1/1982 | De Feo | 137/375 |
| 4,314,580 | 2/1982 | Steinwand . | |
| 4,777,977 | 10/1988 | Platusich | 137/375 |
| 4,836,237 | 6/1989 | McCullough . | |
| 5,228,472 | 7/1993 | Ougiya et al. . | |
| 5,546,977 | 8/1996 | Chaney . | |
| 5,615,700 | 4/1997 | Chaney et al. . | |

*Primary Examiner*—John Fox
*Attorney, Agent, or Firm*—Baker & Botts, L.L.P.

[57] ABSTRACT

A dual containment valve is provided for use in conjunction with dual containment pipes. The dual containment valve includes an inner casing for fluid transport having a first open end, a second open end, a fluid passageway extending therebetween along its longitudinal axis, and an inner casing aperture therein; and an outer casing for leakage protection having a first open end, a second open end, an axial hole extending therebetween along its longitudinal axis, and an outer casing aperture therein. The inner casing is positioned within the axial hole in the outer casing so that the longitudinal axes of both are substantially aligned. The dual containment valve further includes a valve assembly for controlling the flow of fluid within the fluid passageway in the inner casing. The valve assembly includes a valve member that is movably positioned within the inner casing, and is movable between an open position and a closed position; a handle member that is located exterior to the outer casing; and a stem assembly that is integrally joined with the inner and outer casings, and extends from the valve member to the handle member through the inner and outer casing apertures. The stem assembly enables movement of the valve member between the open and closed positions by manipulation of the handle member from the exterior of the outer casing.

18 Claims, 3 Drawing Sheets

DUAL CONTAINMENT VALVE

TECHNICAL FIELD OF THE INVENTION

The present invention relates to a valve for use in conjunction with dual containment pipes, and for controlling the flow of fluid through these dual containment pipes. In particular, the invention relates to a dual containment valve that provides in one integral unit an inner casing for fluid transport, an outer casing for leakage protection, and a valve assembly for controlling the flow of fluid within the inner casing from the exterior of the outer casing.

BACKGROUND OF THE INVENTION

Dual containment pipes are well known, and are frequently used when transporting hazardous materials, or when a piping system may be subject to extreme temperature variations. Dual containment pipes consist of a set of concentric pipes where the inner pipe, or "carrier" pipe, transports fluid, and the outer pipe, or "container" pipe, will prevent leakage into the surrounding environment in the event that the carrier pipe fails. A further advantage of dual containment pipes is that the air that occupies the space between the carrier pipe and the container pipe also functions to insulate the carrier pipe and the fluid that is flowing through it, which may be desirous under many operating conditions. Also, this space can be filled with foam or another insulating material to further insulate the pipe. Finally, this annular space can be used to house monitoring equipment for monitoring the flow of fluid through the carrier pipe.

In order to effectively control the flow of fluid through a series of joined dual containment pipes, a valve, such as a ball valve or butterfly valve, must be inserted between adjacent dual containment pipes at some point along the pipe string. Known dual containment piping systems utilize a standard valve that is designed for use in conjunction with standard, single pipes, where the inlet and outlet ends of the standard valve mate with the carrier pipes of the adjoining dual containment pipes. Use of a standard valve, however, is insufficient because the single casing within which it is contained provides only a single layer of protection against leakage. Further, because a standard valve mates with the carrier pipes of adjoining dual containment pipes, the container pipes of these dual containment pipes are left open at the adjoining ends, and must be otherwise closed off. Accordingly, it has been a common practice to provide an outer containment housing as an additional layer of protection around the entire valve. This outer containment housing, commonly referred to as a "manhole", often is box-like or cylindrical in shape, and is built so that it surrounds the exposed container pipes of the adjoining dual containment pipes, and also to completely surrounds the valve to ensure that leakage from any of these elements is contained within it. Typically, this outer containment housing has a bolted door or other similar access mechanism that allows access to the valve to control the flow of fluid within the dual containment pipes, or to allow for repair or servicing of the valve.

Although this outer containment housing achieves its intended purpose of containing leaks, it does not provide easy accessibility to the valve that controls the fluid flow, which is particularly important in the event of a hazardous material spill or other emergency situations. Further, routine maintenance or periodic adjustments to the flow are difficult and time consuming when the outer containment housing must first be opened or otherwise physically disassembled before the valve may be accessed. Finally, because any leakage will collect in the bottom of the outer containment housing, workers are often exposed to chemicals or other hazardous materials when adjusting or servicing the valve.

SUMMARY OF THE INVENTION

Thus, a need currently exists for a dual containment valve that regulates fluid flow between adjacent dual containment pipes, and that may be accessed quickly and easily when needed. Further, there is a need for such a dual containment valve that provides in one integral unit an inner casing for fluid transport, an outer casing for leakage protection, and a valve assembly for controlling the flow of fluid within the inner casing from the exterior of the outer casing.

Accordingly, a dual containment valve is provided for use in conjunction with first and second dual containment pipes each having an inner pipe member and an outer pipe member. The dual containment valve comprises an inner housing having a first open end, a second open end, a substantially annular fluid passageway extending therebetween along a first longitudinal axis, and an inner casing aperture therein; and an outer casing having a first open end, a second open end, a substantially annular hole extending therebetween along a second longitudinal axis, and an outer casing aperture therein. The inner casing is positioned within the substantially annular hole in the outer casing so that the first and second longitudinal axes are substantially aligned, and so that the inner and outer casings are spaced apart. The dual containment valve further includes a valve assembly for controlling the flow of fluid within the fluid passageway in the inner casing from the exterior of the outer casing. The valve assembly includes a valve member that is movably positioned within the inner casing, and is movable between an open position and a closed position; a handle member that is located exterior to the outer casing; and a stem assembly that extends from the valve member to the handle member through the inner and outer casing apertures, and is integrally joined with the inner and outer casings so as to enclose the inner and outer casing apertures. The stem assembly enables movement of the valve between the open position and the closed position by manipulation of the handle member.

DETAILED DESCRIPTION OF THE INVENTION

Figure 1:
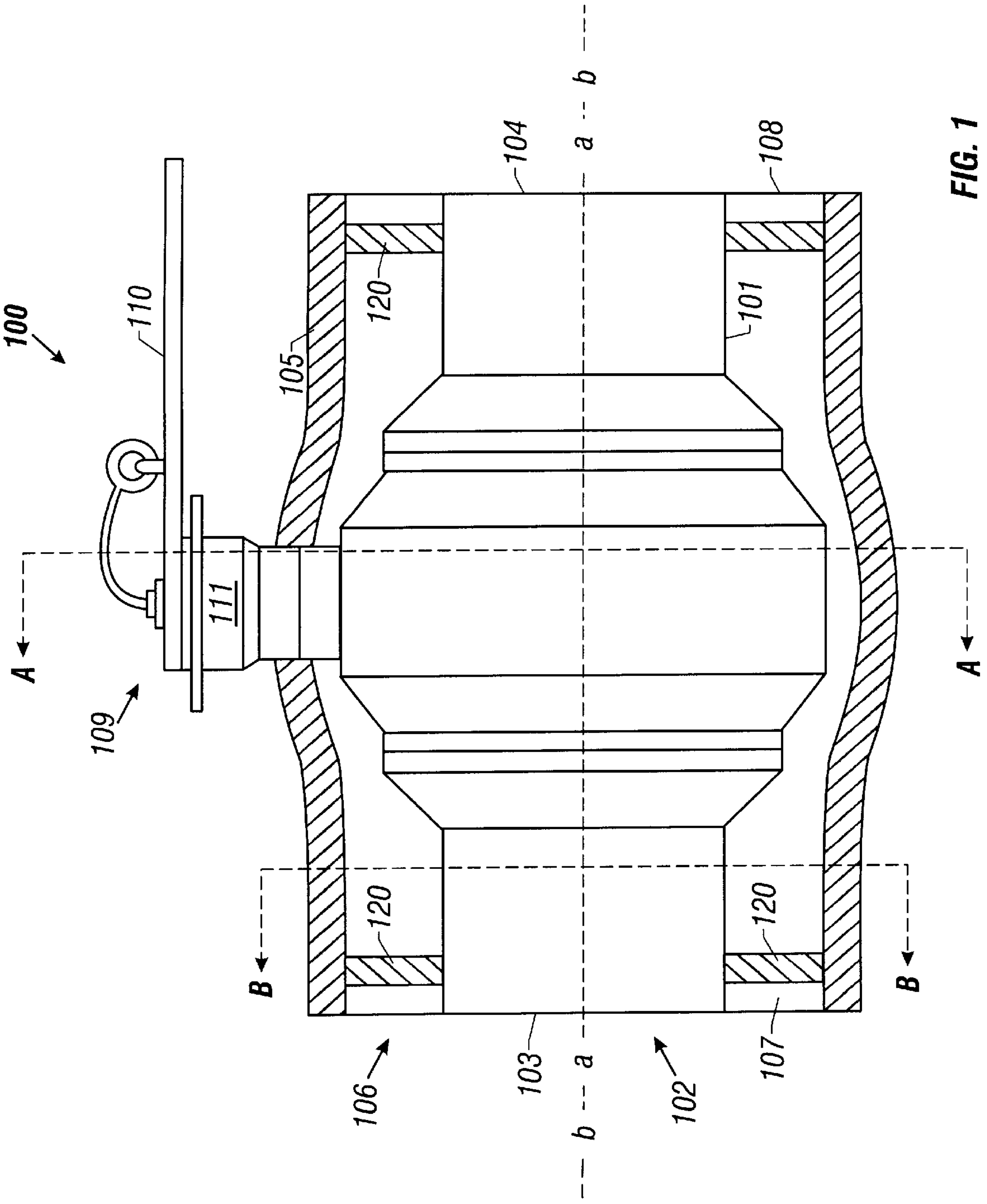
FIG. 1 is a side view of an embodiment of a dual containment valve according to the present invention in which the outer casing is shown in cross-section.

FIG. 1 is a side view illustrating one embodiment of a dual containment valve 100 according to the present invention. The dual containment valve includes an inner casing 101. The inner casing 101 has a longitudinal axis a-a, and has a fluid passageway 102 extending through it along the longitudinal axis between a first open end 103 and a second open end 104. The dual containment valve also includes an outer casing 105 (shown in cross-section) having a longitudinal axis b-b that is substantially aligned with the longitudinal axis a-a of the inner casing 101. The outer casing 105 has an axial hole 106 extending through it along its longitudinal axis between a first open end 107 and a second open end 108. The inner casing 101 is positioned within the axial hole 106 in the outer casing, and is sufficiently smaller in cross-section than the outer casing 105 so that a substantially annular space 121 exists between the outer casing and the inner casing, as shown in FIG. 1. Thus, the inner casing 101 may provide a conduit for fluid transport, and the outer casing 105 may provide added protection against leakage in the event that the inner casing fails.

Figure 4:
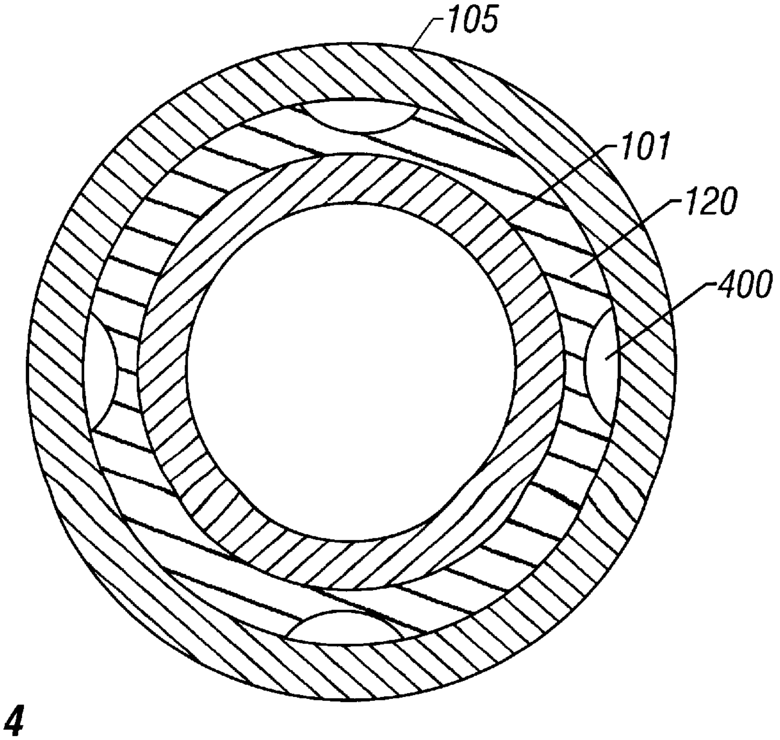
FIG. 4 is a cross-sectional view of a dual containment valve taken along line B—B of FIG. 1.

In one embodiment, a spacers 120 is positioned along the outer circumference of the inner casing, and extends outwardly towards and is secured to the outer casing. Multiple spacers along the circumference could also be used. These spacers 120 will prevent the outer casing 105 from contacting the inner casing. The spacer is substantially annular in shape and extends along the entire outer circumference of the inner casing, and has a plurality of "cut out" portions or apertures 400 (FIG. 4) at periodic intervals along the circumference. These apertures allow fluid to flow in the space between the inner and outer casings, or allow sensors or other measurement devices to pass through.

Figure 2:
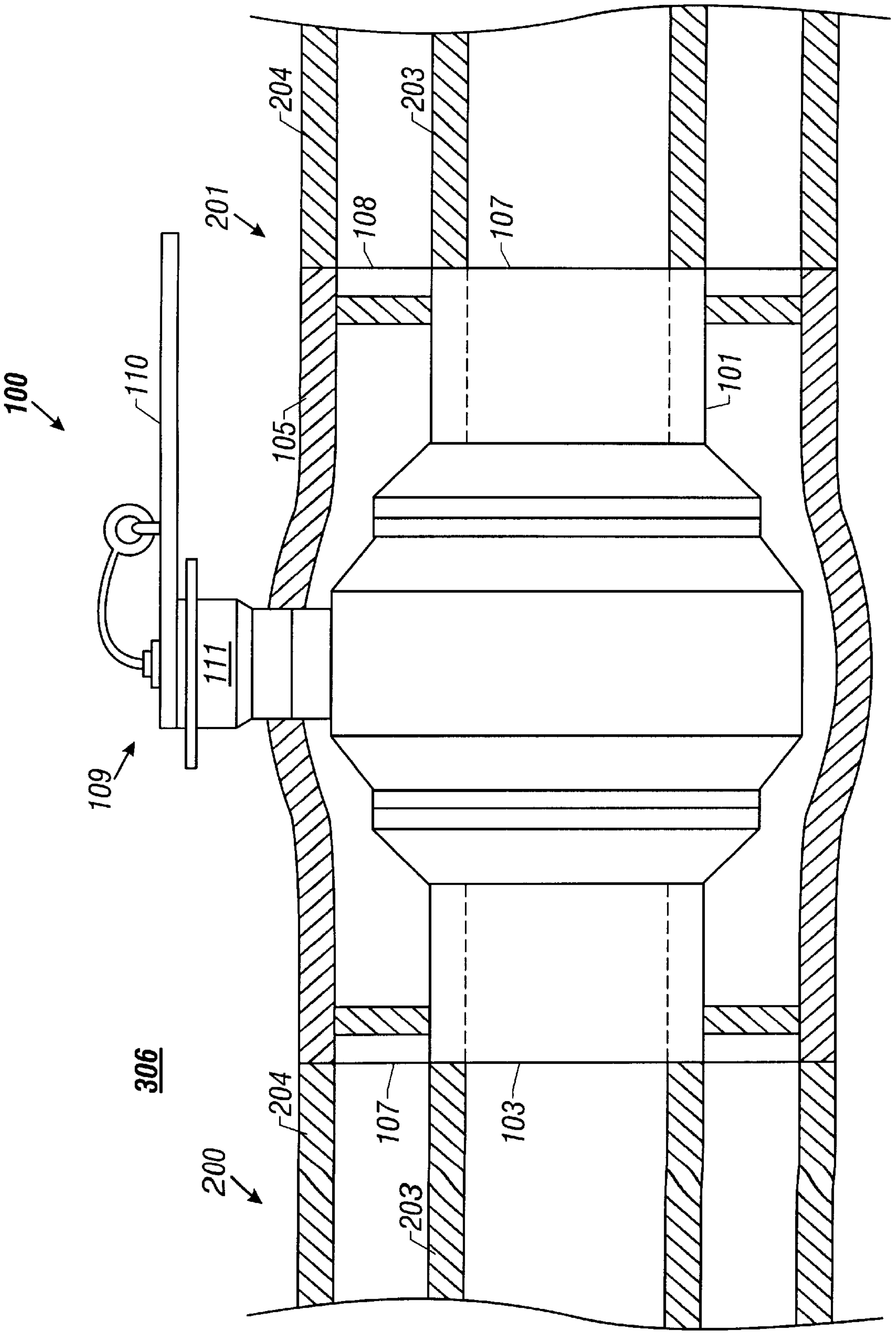
FIG. 2 illustrates the dual containment valve of FIG. 1 connected to two adjoining dual containment pipes, both of which are shown in cross-section.

FIG. 2 illustrates the dual containment valve of FIG. 1 secured or joined at either end to adjoining dual containment pipes 200, 201 (shown in cross-section). The dual containment valve may be joined to dual containment pipes by any suitable method, such as by butt-welding. Each adjoining dual containment pipe includes an inner pipe member 203 for fluid transport, and an outer pipe member 204 for additional leakage protection. Preferably, the first end 103 of the inner casing 101 of the dual containment valve 100 has a cross section that is of a size and shape that is substantially similar to the size and shape of the cross-section of the adjoining end of the inner pipe member 203 of the adjoining dual containment pipe so that they will mate together as shown in FIG. 2. Similarly, the first end 107 of the outer casing 105 has a cross-section that is of a size and shape that is substantially similar in size and shape to the cross-section of the same adjoining end of the outer pipe member 204 of the same dual containment pipe. Likewise, the second ends 104, 108 of the inner and outer casing members 101, 105 have a shape and size that is substantially similar to that of the inner and outer pipe members 203, 204 of the second adjoining dual containment pipe 201 respectively.

Figure 3:
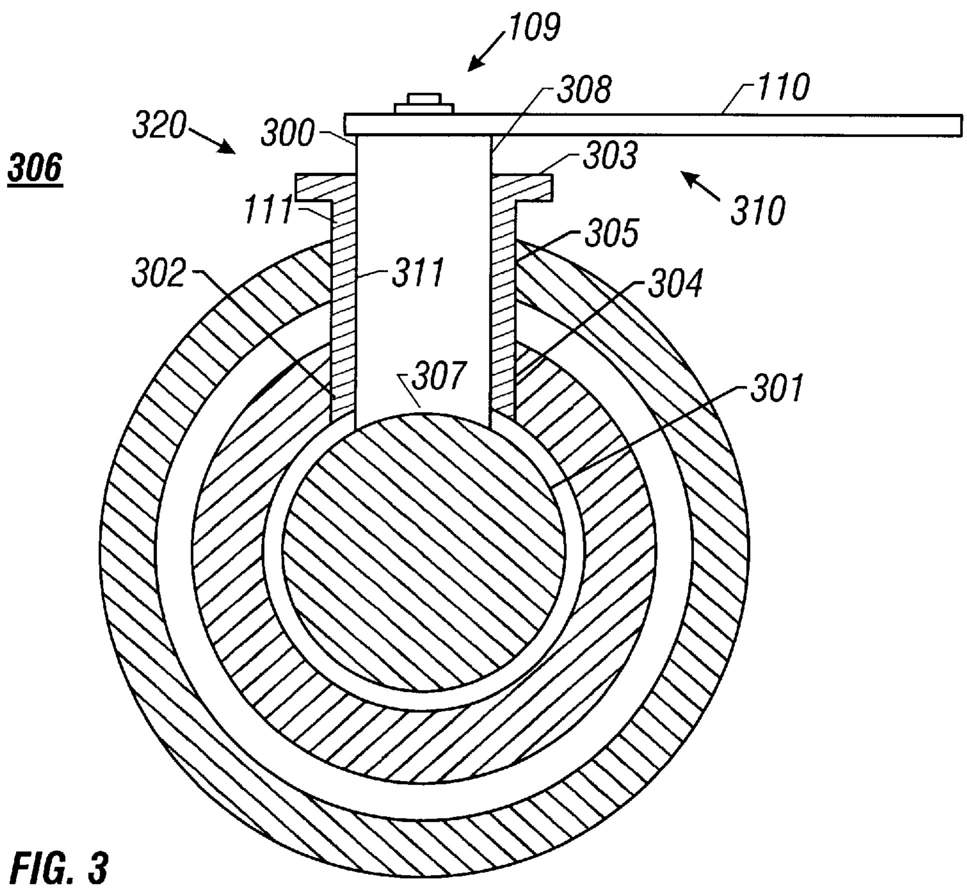
FIG. 3 is a cross-sectional view of a dual containment valve taken along line A—A of FIG. 1.

As shown in FIGS. 1 and 3, the dual containment valve 100 further includes a valve assembly 109 that provides a means by which to control the flow of fluid through the fluid passageway 102 of the inner casing 101 of the dual containment valve. The valve assembly 109 includes a valve member 301 (see FIG. 3 illustrating a ball valve in the closed position), and a valve member adjustment assembly 310 that includes a handle 110 and a stem assembly 320. The stem assembly 320 includes a stem casing 111 (FIGS. 1 and 3) and a stem member 300 (FIG. 3). The valve member 301 is positioned within the inner casing, and is movable between an open position in which fluid may flow through the fluid passageway in the inner casing 101 of the dual containment valve 100, and a closed position in which fluid may not flow through the fluid passageway. The valve member 301 could be a ball valve, a butterfly valve, a gate valve, or the like. Such valve members are well known in the art, and will not be discussed in further detail.

The stem member 300 has a first end 307 and a second end 308, and is secured at its first end 307 to the valve member for movement therewith. The stem member extends from the valve member 301 through an aperture 304 in the inner casing 101, and through an aperture 305 in the outer casing to the exterior 306 of the outer casing 105. The second end 308 of the stem member is secured to the handle 110 so that movement of the handle results in movement of the valve member.

The stem casing 111 has a first end 302, a second end 303, and an axial hole 311 extending through it from the first end to the second end. The first end 302 is secured to the inner casing 101 by butt-welding or any other suitable method, and encloses the aperture 304 in the inner casing by forming a fluid tight barrier around the inner casing aperture. The inner casing may be secured to the outer surface of the inner casing, or may extend through the aperture in the inner casing and be secured to the inner periphery of the aperture, so long as it encloses the aperture. The stem casing 111 is also secured to the outer casing 105 along the inner periphery of the aperture 304 in the outer casing so as to enclose the aperture 305 in a similar manner as that described above. The stem member 300 described above extends from the valve member 301 to the exterior of the outer casing through the axial hole 311 in the stem casing 111. It is movable within the stem casing so that when the handle member 110 is moved, the stem member 300 will move within the stem casing 111 to cause the valve member 301 to also move. In this manner, the valve member can be adjusted between the open position and closed position, and any position in between, from the exterior of the outer casing by manipulating the handle member 110 that is located exterior to the outer casing. Thus, the valve may be adjusted from the exterior, without affecting the integrity of the outer casing, or in other words, without requiring that the outer casing first be opened or physically disassembled in any way before the dual containment valve can be adjusted.

Accordingly, the present invention provides a dual containment valve that includes as one integral unit, an inner casing and an outer casing to provide dual protection against leakage, and a valve assembly. The inventive dual containment valve can readily and easily be joined with adjacent dual containment pipes, and allows for the flow of fluid to readily be controlled from a point exterior to outer casing without requiring opening, or otherwise partially disassembling, the outer casing of the dual containment valve.

What is claimed is:

1. A dual containment valve for use in conjunction with first and second dual containment pipes having an inner pipe member and an outer pipe member, said dual containment valve comprising:

a.) a hollow, fluid tight, integral, one-piece inner casing for fluid transport, said inner casing being substantially annular in cross-section and having a first longitudinal axis, a first open end, a second open end, and a fluid passageway extending therebetween along said longitudinal axis, said first and second ends of said inner casing having a cross-section of a size and shape that is substantially similar to a cross-section of the inner pipe of said first and second dual containment pipes respectively so that said inner casing is capable of mating with said respective inner pipes of said first and second dual containment pipes;

b.) a hollow, fluid tight, integral, one-piece outer casing for leakage protection, said outer casing being substantially annular in cross-section and having a second longitudinal axis, a first open end, a second open end, and an axial hole extending therebetween along said second longitudinal axis, said first and second ends of said outer casing having a cross-section of a size and shape that is substantially similar to a cross-section of the outer pipe of said first and second dual containment pipes respectively so that said outer casing is capable of mating with said outer pipes of said respective first and second dual containment pipes, said inner casing being positioned within said axial hole in said outer casing so that said first and second longitudinal axes are substantially aligned, said inner casing being spaced apart from said outer casing;

c.) an valve assembly for controlling the flow of fluid in said fluid passageway in said inner casing from an exterior of said outer casing, said valve assembly including a valve member movably positioned entirely within said fluid tight inner casing and being movable between a closed position and an open position while positioned entirely within said inner casing, and a valve member adjustment assembly for adjusting said valve member from the exterior of said outer casing between said open position and closed positions, said valve member adjustment assembly including a stem casing member having a substantially cylindrical outer surface, said outer surface being integrally joined with said inner and outer casings and extending therebetween.

2. The dual containment valve according to claim 1, wherein said valve member adjustment assembly further includes a stem casing member having a substantially cylindrical outer surface and first and second open ends, said outer surface being integrally joined with said inner and outer casings and extending therebetween.

3. The dual containment valve according to claim 2, wherein said inner casing has an inner casing aperture therein, and said outer casing has an outer casing aperture therein, said stem casing member being integrally joined at said first end with said inner casing so that said substantially cylindrical outer surface surrounds said inner casing aperture, and being integrally joined at said second end so that said substantially cylindrical outer surface surrounds said outer casing aperture.

4. The dual containment valve according to claim 3, said handle member being located exterior to said outer casing, said handle member having a first end and a second end, said first end being secured to said stem member for movement therewith so that movement of said handle results in movement of said valve member.

5. The dual containment valve according to claim 4, further comprising at least one spacer mounted on said inner casing and extending toward and being secured to said outer casing, said spacer having at least one aperture therein.

6. The dual containment valve according to claim 4, wherein said valve member is a butterfly valve.

7. The dual containment valve according to claim 4, wherein said valve member is a ball valve.

8. The dual containment valve according to claim 4, wherein said valve member is a gate valve.

9. The dual containment valve according to claim 4, wherein said dual containment valve is comprised of thermoplastic materials.

10. A dual containment valve for use in conjunction with first and second dual containment pipes having an inner pipe member and an outer pipe member, said dual containment valve comprising:

a.) an integral, fluid tight one-piece inner casing having a first open end, a second open end, a fluid passageway extending therebetween along a first longitudinal axis, and an inner casing aperture therein, said inner casing being substantially annular in cross-section;

b.) an integral, fluid tight, one-piece outer casing having a first open end, a second open end, a hole extending therebetween along a second longitudinal axis, and an outer casing aperture therein, said inner casing being substantially annular in cross-section, and being positioned within said hole in said outer casing so that said first and second longitudinal axes are substantially aligned, and being spaced apart from said outer casing;

c.) an valve assembly for controlling the flow of fluid within said fluid passageway in said inner casing, said valve assembly including a valve member movably positioned entirely within said inner casing and being movable between an open position and a closed position while positioned entirely within said inner casing, a handle member located exterior to said outer casing, and a stem assembly extending from said valve member to said handle member through said inner casing aperture and said outer casing aperture, and being integrally joined with said inner and outer casings so as to enclose said inner casing aperture and said outer casing aperture, said stem assembly enabling adjustment of said valve member between said open position and said closed position by manipulation of said handle member.

11. The dual containment valve according to claim 10, said stem assembly further comprising a stem casing member and a stem member, said stem casing member having a first open end, a second open end and an axial hole extending therebetween, said first end of said stem casing member being integrally joined with said inner casing so as to enclose said inner casing aperture, said stem casing member extending through said outer casing aperture and being integrally joined with said outer casing so as to enclose said outer casing aperture, said second end of said stem casing member extending to said exterior of said outer casing.

12. The dual containment valve according to claim 11, said stem member having a first end and a second end, said first end of said stem member being secured to said valve member for movement therewith, said stem member extending through said axial hole in said stem casing member to said exterior of said outer casing.

13. The dual containment valve according to claim 12, said handle member having a first end and a second end, said first end of said handle member being secured to said second end of said stem member for movement therewith so that movement of said handle results in movement of said valve member.

14. The dual containment valve according to claim 13, further comprising a plurality of spacers mounted on said inner casing and extending toward said outer casing.

15. The dual containment valve according to claim 13, wherein said valve member is a butterfly valve.

16. The dual containment valve according to claim 13, wherein said valve member is a ball valve.

17. The dual containment valve according to claim 13, wherein said valve member is a gate valve.

18. The dual containment valve according to claim 13, wherein said dual containment valve is comprised of thermoplastic materials.

* * * * *